(12) United States Patent
Sirin et al.

(10) Patent No.: US 11,016,256 B2
(45) Date of Patent: May 25, 2021

(54) FLAME RETARDANT OPTICAL CABLE

(71) Applicant: Prysmian S.p.A., Milan (IT)

(72) Inventors: Zekeriya Sirin, Milan (IT); Baris Soenmez, Milan (IT)

(73) Assignee: PRYSMIAN S.P.A., Milan (IT)

(*) Notice: Subject to any disclaimer, the term of this patent is extended or adjusted under 35 U.S.C. 154(b) by 0 days.

(21) Appl. No.: 16/758,831

(22) PCT Filed: Oct. 30, 2017

(86) PCT No.: PCT/EP2017/077813
§ 371 (c)(1),
(2) Date: Apr. 23, 2020

(87) PCT Pub. No.: WO2019/086103
PCT Pub. Date: May 9, 2019

(65) Prior Publication Data
US 2020/0341221 A1  Oct. 29, 2020

(51) Int. Cl.
*G02B 6/44* (2006.01)

(52) U.S. Cl.
CPC ......... *G02B 6/4436* (2013.01); *G02B 6/4432* (2013.01); *G02B 6/4488* (2013.01)

(58) Field of Classification Search
CPC ... G02B 6/4436; G02B 6/4488; G02B 6/4432
See application file for complete search history.

(56) References Cited

U.S. PATENT DOCUMENTS 6,049,647 A * 4/2000 Register ............... G02B 6/4416
  385/100
6,122,424 A * 9/2000 Bringuier ............. G02B 6/4494
  385/100

(Continued)

FOREIGN PATENT DOCUMENTS

EP      1041420 A1   10/2000
WO   2007049090 A1    5/2007

(Continued)

OTHER PUBLICATIONS

ASTM International D2863-12, "Standard Test Method for Measuring the Minimum Oxygen Concentration to Support Candle-Like Combustion of Plastics (Oxygen Index)," 2012, 14 pages.

(Continued)

*Primary Examiner* — Ryan A Lepisto
(74) *Attorney, Agent, or Firm* — Slater Matsil, LLP

(57) ABSTRACT

A flame-retardant optical cable is disclosed which includes a polymeric central loose tube housing optical fibres, a metallic armour surrounding the polymeric central loose tube, and a multi-layered sheath surrounding and in direct contact with the metallic armour. The multi-layered sheath includes an inner layer, an intermediate layer, and an outer layer, all made of a LSoH flame-retardant material. The LSoH flame-retardant material of the intermediate layer has a limiting oxygen index (LOI) higher than the LOI of the LSoH flame-retardant material of the inner layer and of the outer layer. Such cable has improved flame-retardant properties, particularly in terms of slowing flame propagation, heat release, droplets and emission of smokes, when it is exposed to flames during fire.

20 Claims, 1 Drawing Sheet

(56) References Cited

U.S. PATENT DOCUMENTS

| | | | | |
|---|---|---|---|---|
| 6,330,385 B1* | 12/2001 | Sheu | ................... | G02B 6/4436 |
| | | | | 385/109 |
| 8,422,844 B2* | 4/2013 | Tsukamoto | ............ | G02B 1/048 |
| | | | | 385/128 |
| 9,459,423 B2* | 10/2016 | Gallo | ................... | G02B 6/4436 |
| 10,527,808 B2* | 1/2020 | Sahoo | ................. | G02B 6/4432 |
| 10,534,149 B2* | 1/2020 | Baetz | .................. | G02B 6/4496 |
| 2017/0365378 A1* | 12/2017 | Kaga | ...................... | H01B 7/292 |
| 2019/0101715 A1* | 4/2019 | Hudson, II | ........... | G02B 6/4434 |
| 2020/0126690 A1* | 4/2020 | Sirin | ...................... | H01B 7/295 |
| 2020/0271881 A1* | 8/2020 | Sirin | .................... | G02B 6/4434 |
| 2020/0341221 A1* | 10/2020 | Sirin | .................... | G02B 6/4432 |

FOREIGN PATENT DOCUMENTS

| | | |
|---|---|---|
| WO | 2016144606 A1 | 9/2016 |
| WO | 2017027283 A1 | 2/2017 |

OTHER PUBLICATIONS

Caledonian Cables LTD., "FIRETOX LSZH, Fire Retardant Fiber Optical Cables," 2013, 53 pages.

Cenelec, "Common test methods for cables under tire conditions—Heat release and smoke production measurement on cables during flame spread test—Test apparatus, procedures, results," European Committee for Electrotechnical Standardization, European Standard, EN 50399:2011/A1, Jun. 2016, 10 pages.

National Research Council, Norma Tecnica CEI 20-22/4, "Part 4: Method of Measurement of Oxygen Index for Non Metallic Components," Sep. 1997, 12 pages.

Nexans, "Optical Fibre, Fibre Cables," 2013, http://www.nexans.co.uk; 42 pages.

Norme Internationale International Standard, CEI IEC 61034-2, "Measurement of smoke density of cables burning under defined conditions—Part 2: Test procedure and requirements," Third Edition, 2005, 40 pages.

Official Journal of the European Union, "Commission Delegated Regulation (EU) 2016/364 of Jul. 1, 2015 on the classification of the reaction to fire performance of construction products pursuant to Regulation (EU) No. 305/2011 of the European Parliament and of the Council," Jul. 2015, 8 pages.

* cited by examiner

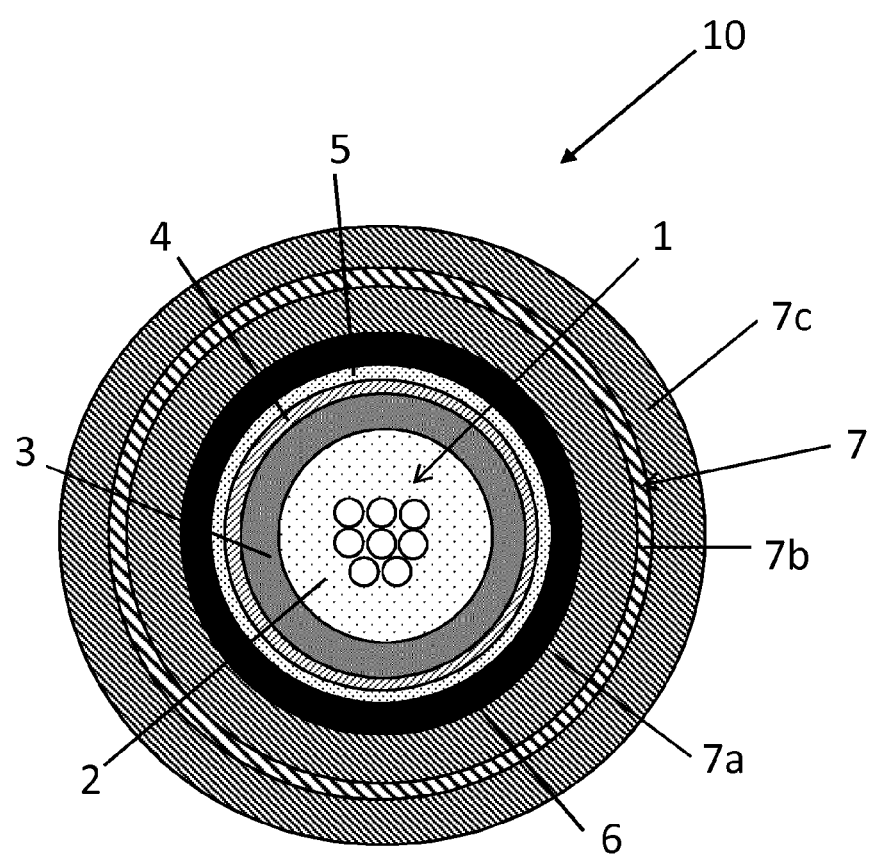

FLAME RETARDANT OPTICAL CABLE

CROSS-REFERENCE TO RELATED APPLICATIONS

This application is a national stage of International Application No. PCT/EP2017/077813, filed on Oct. 30, 2017, which application is hereby incorporated herein by reference in its entirety.

TECHNICAL FIELD

The present invention relates to a flame retardant optical cable.

BACKGROUND

Optical fibre cables are generally used for telecommunications also on long distance, offering irrefutable advantages over traditional wire-based telecommunication networks in terms of capability of transmission of more information at significantly higher speeds.

There are applications where optical cables should have flame retardant properties without significantly decreasing their transmission performance. For instance, cables used in fire alarm systems and/or local video surveillance should be able to continue to transmit data/signals in the presence of fire. In addition, the functionality of the optical cable should be maintained not only during the fire occurrence, but also for a predetermined period of time after the fire is extinguished.

Optical cables of this type are usually installed in galleries and buildings and can comprise a polymeric central loose tube wherein optical fibres are arranged and an outer jacket made of a low smoke zero halogen ("LSZH" or "LSoH") flame retardant material, also referred to as "halogen-free flame-retardant" (HFFR) material.

The flame retardancy of an optical cable can be evaluated for compliance with and certified by national and/or international standards. Such standards generally involve some tests performed on the cable for assessing its capability of operating under fire conditions for a given period of time.

Standards, particularly international standards, require more and more stringent flame retardant and smoke release performances to optical cables to the end of improving the safety in buildings.

Many of the current flame retardant optical cables exhibit performances so that they cannot obtain certification as low fire hazard cables according to current international standards, for example level of class $B2_{ca}$ of the CPR (Construction Product Regulation) issued by the European Union on 1 Jul. 2015. The Applicant experienced that such certification cannot be obtained by increasing the thickness and/or the limiting oxygen index (LOI) of the material forming the outer jacket of the cable and/or providing the cable with additional flame retardant layers such as a flame retardant filler or a steel tape.

The brochure FIRETOX LSZH—Fire Retardant Fiber Optical Cables, Caledonian Cables Ltd., 2013, pages 15-16, discloses, inter alia, an armoured optical fibre cable comprising: a central loose tube containing 2-24 optical fibres and filled with a water-blocking gel; either aramid yarn or glass fiber wound around the tube to provide physical protection and tensile strength, with added fire protection; an inner sheath made of thermoplastic LSZH material, a corrugated steel tape armour applied over an inner LSZH sheath, and—an outer sheath made of thermoplastic LSZH material.

LANmark-OF UC LSZH according to Optical Fibre, Fibre Cables, Nexans, 2013, page 35 is an optical fibre cable comprising: a loose tube having a capacity of up to 24 optical fibres and filled with a gel; reinforced watertight glass yarns; a corrugated steel tape armour surrounded by glass yarns, and an LSZH outer jacket.

As from the tests provided in the following of the description, these prior art cable cannot be qualified as high performance cables against fire.

The fire performances of optical cables may be improved by providing one or more tapes of an inorganic material, for example mica, placed on a support consisting for example of glass fibers, in the construction of the cable. However, the use of mica tapes increases the manufacturing costs significantly.

SUMMARY

A flame-retardant optical cable is disclosed which includes a polymeric central loose tube housing optical fibres, a metallic armour surrounding the polymeric central loose tube, and a multi-layered sheath surrounding and in direct contact with the metallic armour. The multi-layered sheath includes an inner layer, an intermediate layer, and an outer layer, all made of a LSoH flame-retardant material. The LSoH flame-retardant material of the intermediate layer has a limiting oxygen index (LOI) higher than the LOI of the LSoH flame-retardant material of the inner layer and of the outer layer.

BRIEF DESCRIPTION OF THE DRAWINGS

FIG. 1 is a cross-section view of a flame-retardant optical cable according to the present disclosure.

DETAILED DESCRIPTION OF ILLUSTRATIVE EMBODIMENTS

In particular, the present invention relates to a flame retardant optical fibre cable which is able to slow flame propagation, to offer some resistance to fire and to emit non-harmful smoke while maintaining its optical transmissive properties during and after the fire occurrence for a predetermined period of time.

The technical problem faced by the present disclosure is thus that of providing an optical cable having improved flame retardant properties. More specifically, while a limited flame spread and fire growth rate index are required for a cable for being qualified as suitable for residential and standard industrial premises, further properties like low total heat release, low smoke density and few or no flaming droplets are to be complied by a cable for being qualified as suitable for public buildings, high rises, escape routes, and even more limited values are to be shown by a cable for being qualified as suitable for areas with very high fire risks, typically underground railways. See, for example the above mentioned CPR. At the same time, the cable should have mechanical properties proper for its deployment and performance.

The Applicant found that an improvement of the flame retardant properties and a reduction of heat and smoke release in an optical cable can be attained when the cable is provided with a multi-layered sheath where a layer of LSoH flame retardant material with high limiting oxygen index (LOI) is interposed between two layers of LSoH flame retardant material having a lower oxygen index.

In particular, it has been found that the provision of a multi-layered sheath wherein the intermediate layer is made of a LSoH flame-retardant material having a LOI higher than the LOI of the LSoH flame-retardant material of the other layer offers improves flame-retardant properties to the optical cable, particularly in terms of slowing flame propagation, heat release, droplets and emission of smokes, when it is exposed to flames during fire.

The above benefits are achieved without impairing the mechanical properties of the optical cable, particularly in terms of tensile strength and elongation at break, even after thermal ageing, and workability of the sheath, for example through conventional extrusion techniques.

Accordingly, the present disclosure relates to a flame-retardant optical fibre cable comprising a polymeric central loose tube housing optical fibres, a metallic armour surrounding the polymeric central loose tube and a multi-layered sheath surrounding and in direct contact with the metallic armour, wherein the multi-layered sheath comprises an inner layer, an intermediate layer and an outer layer, all made of a LSoH flame-retardant material, the LSoH material of the intermediate layer having a limiting oxygen index (LOI) higher than the LOI of the LSoH material of the inner and outer layers.

According to an embodiment, the intermediate layer of the multi-layered sheath is made of a LSoH flame-retardant material having a LOI higher than 70% and the inner layer and the outer layer of the sheath are both made of a LSoH flame-retardant material having a LOI from 25% to 70%, preferably from 30% to 50%.

In an embodiment, the inner and the outer layer of the multi-layered sheath have a thickness greater than the thickness of the intermediate layer.

In the multi-layered sheath, the thickness of the intermediate layer can be from 0.6 to 1.0 mm, for example 0.8 mm, the thickness of the outer layer can be from 1.7 to 2.0 mm, for example 1.8 mm and the thickness of the inner layer can be from 1.2 to 1.6 mm, for example 1.3 mm.

Within the present description and the subsequent claims, the limiting oxygen index (LOI) is the minimum concentration of oxygen, expressed as percentage, that supports combustion of a polymer in case of fire. Higher values of LOI indicate greater fire retardancy. LOI values are determined by standardized tests, such as ASTM D2863-12 (2012) or CEI 20-22-4 (1997-9).

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein.

As used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It should be understood that the features of the embodiments of the disclosure disclosed above and below can be combined in any way, even forming further embodiments that are not explicitly disclosed but that fall within the scope of the present disclosure.

In the cable according to the disclosure, the optical fibres are housed, for example in loose configuration, in a polymeric central loose tube, also called buffer tube. The optical fibres may be arranged into the central loose tube individually or in groups up to 24. The optical fibres may also be arranged in micromodules. The central loose tube acts as a retaining element for the fibres and protects them from mechanical stresses.

The polymeric central tube may be formed from thermoplastic material(s), such as polyolefins (e.g., polyethylene or polypropylene, such as high-density polyethylene), including fluorinated polyolefins. Exemplary polymeric central tube materials include nucleated polyethylene, nucleated polypropylene, or a copolymer or a blend thereof (e.g., polypropylene-ethylene copolymers or polypropylene-ethylene-octene copolymers). Alternatively, the polymeric central tube may be formed from polyesters, such as polybutene terephthalate (PBT or PBTP), nucleated polybutene terephthalate, or low-shrink polybutene terephthalate; nylon, such as polyamide 12 (PA12), amorphous polyamide 12, or polyamide 11; polyvinyl chloride (PVC); halogen-free flame retardant materials (HFRR); urethane polymers, such as urethane acrylates; and/or blends of these and other polymeric materials.

In an embodiment, the material for the polymeric central loose tube is polybutene terephthalate (PBTP).

The thermoplastic material may contain a pigment or dye to impart a specific colour useful for identification purposes.

Exemplary polymeric central loose tubes with a circular cross section have outer diameters between 2.0 millimeters and 4.0 millimeters and corresponding inner diameters between 1.2 millimeters and 3.1 millimeters. One exemplary polymeric central loose tube with a circular cross section has an inner diameter of 2.8 millimeters or less and an outer diameter of 4.0 millimeters or less. Although polymeric central loose tubes typically have a circular cross section, polymeric central loose tubes alternatively may have an irregular or non-circular shape (e.g., an oval cross-section).

In an embodiment, the polymeric central loose tube is at least partially filled with a water-blocking material. A grease or a grease-like gel may be contained in the polymeric central loose tube and at least partially fill the space between the inner wall of the polymeric central loose tube and the optical fibres. This filling material is intended to block the ingress and advance of water inside the polymeric central loose tube.

In an embodiment, the cable of the disclosure further comprises a reinforcing layer around and in direct contact with the polymeric central loose tube. The reinforcing layer can be made of high-strength fibres, such as aramid and/or fiberglass yarns, optionally embedded in a polymeric matrix. The reinforcing layer provides physical protection and tensile strength with added fire protection. The weight of this layer mainly depends on the required mechanical performance, particularly tensile strength, according to the specific application of the cable.

In an embodiment, the cable of the disclosure further comprises a water-swellable layer surrounding the reinforcing layer, optionally in direct contact with it. In another embodiment, water-swellable particles are provided within the reinforcing layer. The water-swellable layer or particles provides longitudinally water tightness to the cable, thereby preventing water and/or moisture from penetrating along the cable. For example, a water-swellable layer can be a tape including a water-swellable material. For example, the water-swellable layer can be made of yarns, nonwovens, fabrics, foams, or other materials containing/supporting water-swellable particles (e.g., including super absorbent polymers (SAPs), such as SAP powder).

In an embodiment, the metallic armour of the cable of the disclosure can be made from a corrugated, longitudinally sealed steel or copper tape preferably coated by a polymeric layer on at least one face.

The metallic armour improves resistance to transversal mechanical stresses and provides protections against impact and attacks by rodents. The metallic armour also provides some fire protection acting as a fire barrier.

The low smoke zero-halogen (LSoH) materials suitable for all of the layers (inner, intermediate and outer) of the multi-layered sheath are made of a polymer base mixed with an inorganic-flame retardant filler, both the base and the filler being halogen-free.

The polymer base in the multi-layered sheath can be selected from: polyethylene; copolymers of ethylene with at least one α-olefin containing from 3 to 12 carbon atoms, and optionally with at least one diene containing from 4 to 20 carbon atoms; polypropylene; thermoplastic copolymers of propylene with ethylene and/or at least one α-olefin containing from 4 to 12 carbon atoms; copolymers of ethylene with at least one ester selected from alkyl acrylates, alkyl methacrylates and vinyl carboxylates, wherein the alkyl and the carboxylic groups comprised therein are linear or branched, and wherein the linear or branched alkyl group may contain from 1 to 8, preferably from 1 to 4, carbon atoms, while the linear or branched carboxylic group may contain from 2 to 8, preferably from 2 to 5, carbon atoms; and mixtures thereof.

With "α-olefin" it is generally meant an olefin of formula $CH_2=CH-R$, wherein R is a linear or branched alkyl having from 1 to 10 carbon atoms. The α-olefin can be selected, for example, from propylene, i-butene, 1-pentene, 4-methyl-1-pentene, i-hexene, 1-octene, 1-dodecene and the like. Among them, propylene, i-butene, i-hexene and 1-octene are particularly preferred.

Examples of polymer materials that may be used in the sheath of the cable of the disclosure are: high-density polyethylene (HDPE) (d=0.940-0.970 g/cm$^3$), medium-density polyethylene (MDPE) (d=0.926-0.940 g/cm$^3$), low-density polyethylene (LDPE) (d=0.910-0.926 g/cm$^3$); linear low-density polyethylene (LLDPE) and very-low-density polyethylene (VLDPE) (d=0.860-0.910 g/cm$^3$); polypropylene (PP); thermoplastic copolymers of propylene with ethylene; ethylene/vinyl acetate (EVA) copolymers; ethylene/ethyl acrylate (EEA) copolymers, ethylene/butyl acrylate (EBA) copolymers; ethylene/α-olefin rubbers, in particular ethylene/propylene rubbers (EPR), ethylene/propylene/diene rubbers (EPDM); and mixtures thereof.

In an embodiment, the inorganic flame-retardant filler is selected from: metal hydroxides, hydrated metal oxides, metal salts having at least one hydroxyl group, and hydrated metal salts; particularly, the flame-retardant filler is a calcium, aluminum, magnesium or zinc hydroxide, hydrated oxide, salt having at least one hydroxyl group or hydrated salt.

Examples of inorganic flame-retardant fillers which may be used in the outer sheath of the cable of the disclosure are: magnesium hydroxide, alumina trihydrate, hydrated magnesium carbonate, hydrated calcium, magnesium carbonate, or mixtures thereof. In an embodiment, the inorganic flame-retardant filler is magnesium hydroxide since it is characterized by a decomposition temperature of about 340° C. and thus allows high extrusion temperatures to be used. The magnesium hydroxide of the present disclosure can be of synthetic or natural origin, the latter being obtained by grinding minerals based on magnesium hydroxide, such as brucite or the like, as described, for example, in WO2007/049090.

The flame-retardant filler can be used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like. In order to increase the compatibility with the polymer material, the flame-retardant filler can likewise be surface-treated with suitable coupling agents, for example short chain organic silanes or titanates such as vinyltriethoxysilane, vinyltriacetylsilane, tetraisopropyl titanate, tetra-n-butyl titanate and the like.

In an embodiment of the present disclosure, the intermediate layer of the multi-layered sheath is made of a LSoH flame-retardant material having a limiting oxygen index (LOI) higher than 70%, preferably from 75% to 90%, whereas the inner layer and the outer layer of the multi-layered sheath are both made of a LSoH flame-retardant material having a LOI lower than that of the intermediate layer, comprised of from $2_5$% to 70%. In an embodiment, the LOI of the inner and of the outer layer materials range from 30% to 50%.

In an embodiment the inner layer and the outer layer of the multi-layered sheath are made of substantially the same LSoH flame-retardant material.

In another embodiment, the inner layer is made of a LSoH flame-retardant material having a LOI lower than that of the outer layer. The LOI of the inner layer material can range from 25 to 35%, while the LOI of the outer layer material can range from 35 to 50%. It is clear to the person skilled in the art that in this embodiment when the outer layer material has a LOI of 35%, the inner layer material will have a lower LOI within the range specified above.

This can be achieved by varying the amount of inorganic flame-retardant filler mixed to the polymer base which will be greater in the flame-retardant material forming the intermediate layer of the sheath and lower in the material forming the outer layer and the inner layer of the sheath In particular, according to an embodiment of the present disclosure, the amount of the flame-retardant filler in the LSoH material of the intermediate layer of the multi-layered sheath is of at least 500 phr, preferably from 600 phr to 900 phr.

According to an embodiment of the present disclosure, the amount of the flame-retardant filler in the LSoH material of the outer layer and of the inner layer of the multi-layered sheath is lower than 500 phr, preferably from 150 phr to 300 phr.

According to an embodiment of the present disclosure, the amount of the flame-retardant filler in the LSoH material of the outer layer is of from 180 phr to 400 phr, and the amount of the flame-retardant filler in the LSoH material of the inner layer is from 150 phr to 180 phr.

Within the present description and the claims, the term "phr" (acronym of "parts per hundred of rubbers") is used to indicate parts by weight per 100 parts by weight of the polymer base.

The layers of the multi-layered sheath are in direct contact with one another so that the inner layer is surrounded and in direct contact with the intermediate layer which, in turn, is surrounded and in direct contact with the outer layer.

The production of the optical cable according to the disclosure can be carried out by conventional techniques. For example, the application of the reinforcing layer and of the metallic armour layer can be carried out through sheathing machines and the armour can also be thermally sealed along the overlapping. In addition, the multi-layered sheath can be applied to surround the metallic armour through conventional plastic material extrusion processes. For example, the multi-layered sheath can be applied by means of the "tandem" technique, in which separate extruders arranged in series are used for applying the innermost layer, if required, the inner layer and subsequently the outer layer, or by co-extruding the innermost layer, if required, the inner layer and the outer layer.

Further details will be illustrated in the following detailed description, with reference to the appended FIG. 1 which is a cross-section view of a flame-retardant optical cable according to the present disclosure.

With reference to FIG. 1, a flame-retardant cable according to the disclosure is denoted, as a whole, by the reference number 10. The cable 10 comprises a plurality of optical fibres 1 arranged loosely in the polymeric central loose tube 3 made, for example, of polybutene terephthalate (PBTP). The polymeric central loose tube 3 also contain a water-blocking filler 2, e.g. a water-blocking gel.

The optical cable 10 further comprises: a reinforcing layer 4 around the central loose tube 3 including, for example, aramid or glass yarns; a water-swellable layer 5 around the reinforcing layer 4 having essentially the function of blocking the ingress and transport of water and/or moisture towards the inside of the cable; a metallic armour 6, for example a corrugated steel tape, preferably coated with a thermoplastic material layer, located around the water-swellable layer 5 for the purpose of protection against impacts and attacks by rodents and mechanical stresses, and a multi-layered sheath 7 made of flame-retardant LSoH material.

The multi-layered sheath 7 comprises an inner layer 7a, an intermediate layer 7b and an outer layer 7c, all made of a halogen-free polymeric base, such as ethylene polymers, copolymers or mixture thereof, filled with a flame-retardant inorganic material such as magnesium hydroxide.

The present disclosure will now be described by means of the results of tests under fire conditions which were carried out on some optical cables according to the present disclosure and on some prior art optical cables for comparison.

Optical cables according to the invention and comparative cables were tested to evaluate their flame retardants properties.

All of the optical cables tested had a polymeric central loose tube loosely housing optical fibres, a reinforcing layer (in glass yarns) and a water-swellable tape surrounding the central loose tube, an armour in form of a corrugated steel tape and a LSoH flame retardant sheath as outermost layer.

Further specific features of the comparative cables and of the cables of the invention are provided in Table 1.

TABLE 1

| Cable | Optical fibres No. | Sheath layers (LOI) | Sheath thickness | Cable diameter |
|---|---|---|---|---|
| 1* | 8 | single (36%) | 1.4 mm | 9.26 mm |
| 2* | 8 | single (36%) | 1.2 mm | 7.39 mm |
| 3* | 8 | single (47%) | 2.5 mm | 10.49 mm |
| 4 | 24 | inner (28%) intermediate (>80%) outer (36%) | 3.8 mm (1.3 mm + 0.8 mm + 1.7 mm) | 14.79 mm |
| 5 | 4 | inner (28%) intermediate (>80%) outer (37%) | 3.88 mm (1.4 mm + 0.9 mm + 1.58 mm) | 14.07 mm |

Cable marked with asterisk (*) are the comparative ones as they have a sheath made of a single layer The set-ups used for the tests under fire conditions were substantially those specified by EN50399:2011/A1 (2016) for flame spread (damaged length) (FS), total heat release (THR), peak heat release rate (HRR), fire growth rate index (FIGRA) and persistence of flaming droplets; and by IEC 61034-2 (2005) for total smoke production (TSP) and peak smoke production rate (SPR).

The results of the tests are shown in the following Table 2.

TABLE 2

| Cable | FS (m) | THR (MJ) | Peak HRR (kW) | FIGRA (W/s) | TSP (m$^2$) | Peak SPR (m$^2$/s) | Flaming Droplet Persistence (sec.) |
|---|---|---|---|---|---|---|---|
| 1* | 3.0 | 46.6 | 101.1 | 276.6 | 74.1 | 0.13 | 18 |
| 2* | 3.0 | 52.2 | 174.1 | 422.9 | 44.5 | 0.10 | 1 |
| 3* | 2.26 | 31.3 | 61.2 | 138.2 | 36.6 | 0.06 | 22 |
| 4 | 1.13 | 13.8 | 17.4 | 44.4 | 15 | 0.04 | 5 |
| 5 | 1.16 | 12.6 | 15.7 | 43.6 | 17.2 | 0.04 | 4 |

From the above results, both cable 4 and 5 according to the disclosure qualified as cables suitable for areas with very high fire risk, while the comparative cables 1*, 2* and 3* qualified as suitable for areas with medium fire risk.

According to Table 4 of the Commission Delegated Regulation (EU) 2016/364 of 1 Jul. 2015 on the classification of the reaction to fire performance of construction products pursuant to Regulation (EU) No 305/2011, cables 4 and 5 according to the present disclosure are classified as $B2_{ca}$s1d1 as having FS (Flame Spread) 1.5 m; THR (Total Heat Release)≤15 MJ; Peak HRR (Heat Release Rate)≤30 kW; and FIGRA (Fire Growth Rate Index)≤150 W/s TSP (Total Smoke Production)≤50 m$^2$ Peak SPR (Smoke Production Rate)≤0.25 m$^2$/s, and Flaming droplet persistence≤10 s.

According to Table 4 of the Commission Delegated Regulation (EU) 2016/364 of 1 Jul. 2015 on the classification of the reaction to fire performance of construction products pursuant to Regulation (EU) No 305/2011, comparative cables 1*, 2* and 3* are classified as D only (basic level of safety).

The invention claimed is:

1. A flame-retardant optical cable comprising:
   a polymeric central loose tube housing optical fibres;
   a metallic armour surrounding the polymeric central loose tube; and
   a multi-layered sheath surrounding and in direct contact with the metallic armour, wherein the multi-layered sheath comprises an inner layer, an intermediate layer and an outer layer all made of a LSoH flame-retardant material, and wherein the LSoH flame-retardant material of the intermediate layer has a limiting oxygen index (LOI) higher than the LOI of the LSoH flame-retardant material of the inner layer and of the outer layer.

2. The optical cable according claim 1, wherein the intermediate layer of the multi-layered sheath is made of a LSoH flame-retardant material having a LOI higher than 70% and wherein the inner layer and the outer layer of the sheath are both made of a LSoH flame-retardant material having a LOI from 25% to 70%.

3. The optical cable according claim 2, wherein the intermediate layer is made of a LSoH flame-retardant material having a LOI from 75% to 90%.

4. The optical cable according claim 2, wherein the inner layer and the outer layer of the sheath are both made of a LSoH flame-retardant material having a LOI from 30% to 50%.

5. The optical cable according claim 1, wherein the inner layer and the outer layer are made of the same LSoH flame-retardant material.

6. The optical cable according claim 1, wherein the inner layer is made of a LSoH flame-retardant material having a LOI lower than that of the outer layer.

7. The optical cable according claim 6, wherein the inner layer is made of a LSoH flame-retardant material having a LOI from 25 to 35%, and wherein the outer layer is made of a LSoH flame-retardant material having a LOI from 35 to 50%.

8. The optical cable according to claim 1, wherein the inner layer and the outer layer of the multi-layered sheath have a thickness greater than the thickness of the intermediate layer.

9. The optical cable according to claim 1, wherein the polymeric central loose tube is at least partially filled with a water-blocking material.

10. The optical cable according to claim 1, further comprising a reinforcing layer around and in direct contact with the polymeric central loose tube.

11. The optical cable according to claim 10, wherein the reinforcing layer comprises aramid.

12. The optical cable according claim 10, further comprising a water-swellable layer surrounding the reinforcing layer and the metallic armour.

13. The optical cable according to claim 10, wherein the reinforcing layer comprises fiberglass yarns.

14. An optical cable comprising:
    a polymeric central loose tube housing optical fibres;
    a reinforcing layer around and in direct contact with the polymeric central loose tube;
    a metallic armour surrounding the reinforcing layer; and
    a multi-layered sheath surrounding and in direct contact with the metallic armour, wherein the multi-layered sheath comprises an inner layer, an intermediate layer and an outer layer, all made of a LSoH flame-retardant material, and wherein the LSoH flame-retardant material of the intermediate layer has a limiting oxygen index (LOI) higher than the LOI of the LSoH flame-retardant material of the inner layer and of the outer layer.

15. The optical cable according to claim 14, further comprising a water-swellable layer surrounding the reinforcing layer and the metallic armour.

16. The optical cable according to claim 14, wherein the reinforcing layer comprises fiberglass yarns.

17. The optical cable according to claim 14, wherein the intermediate layer of the multi-layered sheath is made of a LSoH flame-retardant material having a LOI higher than 70% and wherein the inner layer and the outer layer of the sheath are both made of a LSoH flame-retardant material having a LOI from 25% to 70%.

18. The optical cable according to claim 14, wherein the intermediate layer is made of a LSoH flame-retardant material having a LOI from 75% to 90%, wherein the inner layer and the outer layer of the sheath are both made of a LSoH flame-retardant material having a LOI from 30% to 50%.

19. The optical cable according claim 14, wherein the inner layer is made of a LSoH flame-retardant material having a LOI lower than that of the outer layer.

20. The optical cable according to claim 14, wherein the polymeric central loose tube is at least partially filled with a water-blocking material.

* * * * *